(12) United States Patent
Sun et al.

(10) Patent No.: US 10,496,650 B1
(45) Date of Patent: Dec. 3, 2019

(54) FINE-GRAINED VIDEO CLASSIFICATION

(71) Applicant: Google LLC, Mountain View, CA (US)

(72) Inventors: Chen Sun, Los Angeles, CA (US); Sanketh Shetty, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 485 days.

(21) Appl. No.: 14/631,802

(22) Filed: Feb. 25, 2015

(51) Int. Cl.
*G06F 16/2457* (2019.01)

(52) U.S. Cl.
CPC .. *G06F 16/24578* (2019.01); *G06F 16/24573* (2019.01)

(58) Field of Classification Search
CPC .... G06F 17/40; G06F 17/30011; G06F 17/10; G06F 17/3082; G06F 21/31; G06F 21/86; G06F 16/24578
See application file for complete search history.

(56) References Cited

U.S. PATENT DOCUMENTS

| | | | | |
|---|---|---|---|---|
| 2011/0320454 | A1* | 12/2011 | Hill | G06N 99/005 707/739 |
| 2012/0033875 | A1* | 2/2012 | Bergman | G06T 7/11 382/164 |
| 2013/0262588 | A1* | 10/2013 | Barak | H04L 67/22 709/204 |
| 2014/0349750 | A1* | 11/2014 | Thompson | A63F 13/12 463/31 |
| 2015/0296170 | A1* | 10/2015 | Farrell | H04N 5/913 386/254 |

OTHER PUBLICATIONS

Anonymous CVPR Submission, "Temporal Localization of Fine-Grained Actions in Videos by Domain Transfer from Web Images" Submission No. 502, CVPR, 2015, pp. 1-9.
Baccouche, M., et al., "Action classification in soccer videos with long short-term memory recurrent neural networks," In ICANN, 2010, Part II, LNCS 6353, pp. 154-159.
Chen, J. et al., "Event-driven semantic concept discovery by exploiting weakly tagged internet Images," In ICMR, Apr. 2014, 8 Pages.
Dalal, N., et al., "Histograms of oriented gradients for human detection," In CVPR, IEEE Computer Society Conference on Computer Vision and Pattern Recognition, 2005, 8 Pages.
Deng, J., et al., "ImageNet: A Large-Scale Hierarchical Image Database," In CVPR, 2009, pp. 248-255.
Divvala, S.K., et al., "Learning everything about anything: Webly-supervised visual concept learning," In CVPR, 2014, pp. 3270-3277.

(Continued)

*Primary Examiner* — Mariela Reyes
*Assistant Examiner* — Courtney Harmon
(74) *Attorney, Agent, or Firm* — Byrne Poh LLP

(57) ABSTRACT

Video segments related to an annotation term are identified from a target video. A video dataset and an image data set are searched using the annotation term to generate a video set and an image set. The video set and the image set are iteratively refined to generate a set of iconic images. A frame level model is generated using the set of iconic images and video segments related to the annotation term are identified from the target video by applying the frame level model to frames of the target video.

17 Claims, 4 Drawing Sheets

(56) References Cited

OTHER PUBLICATIONS

Dollar, P., et al., "Behavior recognition via sparse spatio-temporal features," In PETS, Proceedings $2^{nd}$ Joint IEEE International Workshop on VX-PETS, Oct. 2005, pp. 65-72.
Girshick, R., et al., "Rich feature hierarchies for accurate object detection and semantic segmentation," In Computer Vision and Pattern Recognition, 2014, pp. 580-587.
Graves, A., et al., "Speech recognition with deep recurrent neural networks," ICASSP, 2013, pp. 6645-6649.
Graves, A., et al., "Offline handwriting recognition with multidimensional recurrent neural networks," In NIPS, 2008, pp. 1-8.
Habibian, A., et al., "Recommendations for video event recognition using concept vocabularies," In ICMR, 2013, pp. 89-96.
Hochreiter, S., et al., "Long short-term memory," Neural Computation, 1997, 32 pages, vol. 9(8), pp. 1-42.
Jiang, Y.-G., et al., "THUMOS challenge: Action recognition with a large number of classes," 2014, http://crcv.ucf.edu/THUMOS14/.
Karpathy, A., et al., "Large-scale video classification with convolutional neural networks," IEEE Conference on Computer Vision and Pattern Recognition, 2014, pp. 1725-1732.
Krizhevsky, A., et al., Imagenet classification with deep convolutional neural networks. In NIPS, 2012, pp. 1-9.
Kuehne, H., et al., "HMDB: a large video database for human motion recognition," In IEEE International Conference on Computer Vision, 2011, pp. 2556-2563.
Lowe, D.G., "Distinctive image features from scale-invariant keypoints," International Journal of Computer Vision, 2004, vol. 60, No. 2, pp. 91-110.
Oneata, D., et al., "Action and Event Recognition with Fisher Vectors on a Compact Feature Set," In IEEE International Conference on Computer Vision, 2013, pp. 1817-1824.
Over, P., et al., "TRECVID 2013—an overview of the goals, tasks, data, evaluation mechanisms and metrics," In TRECVID, 2013, pp. 1-45.
Perronnin, F., et al., "Fisher kernels on visual vocabularies for image categorization," In CVPR, 2007, 8 Pages.
Rohrbach, M., et al., "A database for fine grained activity detection of cooking activities," In CVPR, 2012, pp. 1194-1201.
Sak, H., et al., "Long short-term memory based recurrent neural network architectures for large vocabulary speech recognition," CoRR, Feb. 2014, 5 Pages.
Schuldt, C., et al., "Recognizing human actions: A local SVM approach," In Proceedings of the 17th International Conference on Pattern Recognition (ICPR'04), 2004, 5 Pages.
Simonyan, K., et al., "Two-stream convolutional networks for action recognition in videos," In NIPS, 2014, pp. 1-9.
Soomro, K., et al., "UCF101: A dataset of 101 human actions classes from videos in the wild," CRCVTR-12-01, Nov. 2012, 7 Pages.
Sun, C., et al., "ISOMER: Informative segment observations for multimedia event recounting," In ICMR, Apr. 2014, 8 Pages.
Wang, H., et al., "Dense trajectories and motion boundary descriptors for action recognition," IJCV, 2013, pp. 60-79.
Wang, J., et al., "Learning fine-grained image similarity with deep ranking," IEEE Conference on Computer Vision and Pattern Recognition, 2014, pp. 1386-1393.
Williams, R.J., et al., "An efficient gradient-based algorithm for on-line training of recurrent network trajectories," Neural Computation, 1990, vol. 2, No. 4, pp. 490-501.
Yang, W., et al., "Discriminative tag learning on youtube videos with latent sub-tags," In CVPR, 2011, pp. 3217-3224.
Yang, Y., et al., "Effective transfer tagging from image to video," TOMM, ACM Transactions on Multimedia Computing, Communications and Applications, vol. 9, No. 2, Article 14, May 2013, pp. 14:1-14:20.

* cited by examiner

FINE-GRAINED VIDEO CLASSIFICATION

BACKGROUND

1. Field of Art

The disclosure generally relates to the field of classifying videos, and in particular, to using image search results and video search results to annotate video segments.

2. Description of the Related Art

Faster internet connections and cheaper storage have enabled longer video content to be shared within the Internet. The videos are oftentimes annotated with annotation terms that describe the content of the video, but due to the increasing length of the videos, finding specific video segments that correspond to the annotation terms within videos is becoming increasingly difficult. For instance, a user may want to see the goals scored in a soccer match, but searching for one or two goals in a 90 minute video annotated with the term "goal" may be difficult and time consuming.

SUMMARY

The above and other needs are met by a method, computer-readable storage medium, and computer system for identifying video segments related to an annotation term. An embodiment of the method comprises searching a video dataset based on the annotation term to generate a video set of videos associated with the annotation term and searching an image data set based on the annotation term to generate an image set of images associated with the annotation term. The method further comprises iteratively refining the video set and the image set to generate a set iconic images. The method additionally comprises generating a frame level model using the set of iconic images and identifying video segments of a target video related to the annotation term by applying the generated frame level model to frames of the target video.

Embodiments of the computer-readable storage medium store computer-executable instructions for performing the steps described above. Embodiments of the computer system further comprise a processor for executing the computer-executable instructions.

The features and advantages described in this summary and the following description are not all inclusive and, in particular, many additional features and advantages will be apparent in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The Figures and the following description relate to particular embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. Alternative embodiments of the structures and methods illustrated herein may be employed without departing from the principles described herein.

System Architecture

Figure 1:
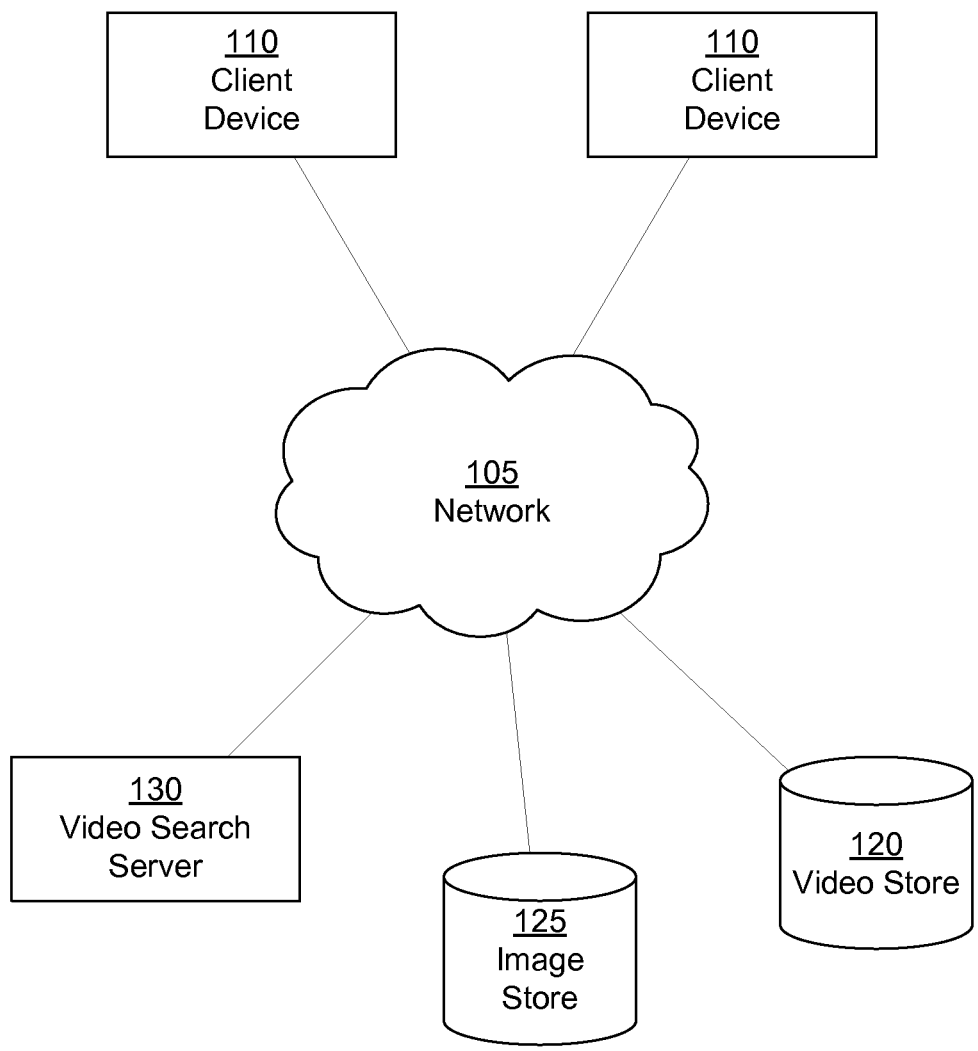
FIG. 1 illustrates a block diagram of a networked environment for annotating video segments, according to one embodiment.

FIG. 1 illustrates a block diagram of a networked environment for annotating video segments, according to one embodiment. The entities of the networked environment include client devices 110, a video search server 130, a video store 120, an image store 125, and a network 105. In some embodiments, the functionalities of the entities may be distributed among multiple instances. For example, a video search network of servers at geographically dispersed locations may implement the video search server 130 to increase server responsiveness and to reduce digital content loading times.

The client device 110 accesses digital content through the network 105 and presents digital content to a user. Presenting digital content includes playing a video or audio file as well as displaying an image or animation. In one embodiment, the client device 110 is a computer, which is described further below with respect to FIG. 5. Example client devices 110 include a desktop, a laptop, a tablet, a mobile device, a smart television, and a wearable device. Using the client device 110, a user may search the video store 120 for the content using the video search server 130. For example, the user may use perform a keyword search to search for video content annotated with the keyword. The client device 110 may contain software such as a web browser, a video player, or other application for viewing digital content. The user may access the video search server 130 though an interface presented on the client device 110.

The video store 120 stores video content. The video content stored in the video store may be uploaded via network 105 by users using client devices 110, may be stored in the video store 120 by a content provider, or may include indexed video content found in third party servers or web pages. The videos stored in the video store 120 may be annotated with one or more annotation terms. The annotation terms describe the content included in an associated video. For instance, a video of a basketball game may be annotated with the term "basketball." The annotation terms may be used to search the video store 120. For instance, videos that are related to basketball may be searched from the video store 120 by identifying the videos that are annotated with the term "basketball." Some annotation terms may describe a portion of a video instead of the entire video. For instance, a basketball video may be annotated with the annotation term "slam dunk." The annotation term "slam dunk" may describe portions of the video that show slam dunks, but the video annotated with the term "slam dunk" may also include video segments that are not related to slam dunks.

The image store 125 stores image content. The image content stored in the image store may include images uploaded via network 105 by users using client devices 110, may be provided by a content provider, or may include images indexed from third party servers or web pages. The images stored in the image store 125 may be annotated with one or more annotation terms. The annotation terms describe the image with which the annotation term is associated. The annotation terms may be used to search the image store 125 for specific content. For instance, images that are related to basketball may be searched from the image store 125 by identifying the images that are annotated with the term "basketball."

The video search server 130 searches the video store 120 for content related to a search term. For instance, a user may use the video search server 130 to search for videos associated with a search term. The user may provide the video search server 130 with a search term, and the video search server 130 identifies the videos that are associated with the search term by finding videos that are annotated with the search term. The video search server 130 provides videos or video segments that are associated with the search term to the user. For instance, if a user provides the term "slam dunk," the video search server 130 provides the user with videos and video segments that show slam dunks. A detailed description of the video search server is provided below in conjunction with FIG. 2.

The network 105 enables communications among the entities connected to it through one or more local-area networks and/or wide-area networks. In one embodiment, the network 105 is the Internet and uses standard wired and/or wireless communications technologies and/or protocols. The network 105 can include links using technologies such as Ethernet, 802.11, worldwide interoperability for microwave access (WiMAX), long term evolution (LTE), 3G, 4G, digital subscriber line (DSL), asynchronous transfer mode (ATM), InfiniBand, and/or PCI Express Advanced Switching. Similarly, the networking protocols used on the networks 105 can include multiprotocol label switching (MPLS), transmission control protocol/Internet protocol (TCP/IP), User Datagram Protocol (UDP), hypertext transport protocol (HTTP), simple mail transfer protocol (SMTP), and/or file transfer protocol (FTP).

The data exchanged over the network 105 can be represented using technologies and/or formats including hypertext markup language (HTML), extensible markup language (XML), and/or JavaScript Object Notation (JSON). In addition, all or some of the transmitted data can be encrypted using conventional encryption technologies such as the secure sockets layer (SSL), transport layer security (TLS), virtual private networks (VPNs), and/or Internet Protocol security (IPsec). In another embodiment, the entities use custom and/or dedicated data communications technologies instead of, or in addition to, the ones described above.

Video Search Server

Figure 2:
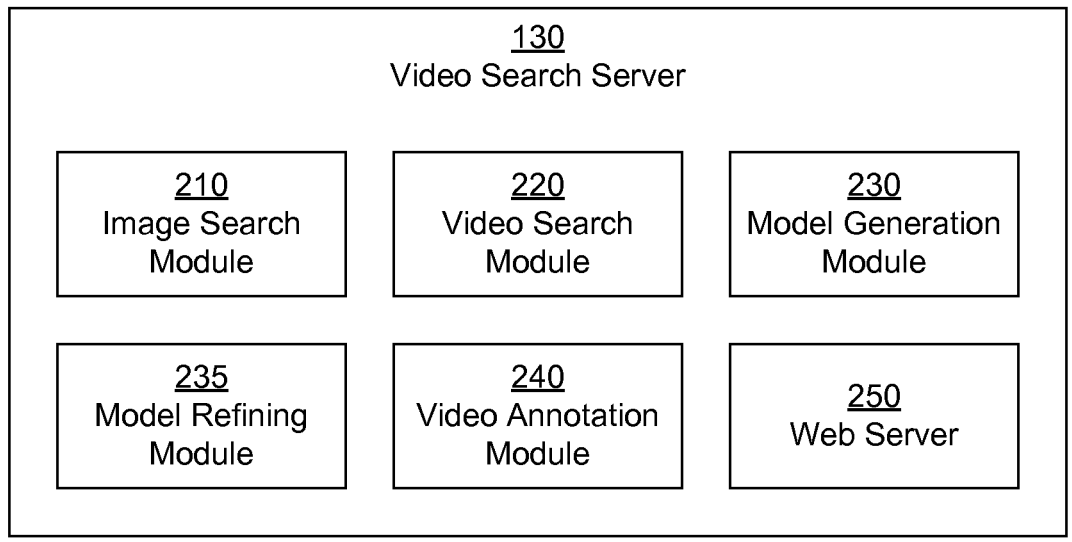
FIG. 2 illustrates a block diagram of the video search server, according to one embodiment.

FIG. 2 illustrates a block diagram of the video search server 130, according to one embodiment. The video search server 130 includes an image search module 210, a video search module 220, a model generation module 230, a model refining module 235, a video annotation module 240, and a web server 250. The functionality of the illustrated components may be duplicated or redistributed among a different configuration of modules in other embodiments.

The image search module 210 searches for images from the image store 125 using one or more search terms. The image search module 210 may search the image store 125 by identifying images that are annotated with the search term. In one embodiment, the image search module 210 identifies images that are associated with an annotation term equal to, substantially equal to, or related to the search term. For instance, for a user providing the search term "soccer," the image search module 210 searches the image store 125 for images that are associated with the annotation term "soccer." Additionally, the image search module 210 may search the image store 125 for images that are associated with the annotation term "football," or the annotation term "futbol."

The video search module 220 searches for videos from the video store 120 using one or more search terms. The video search module 220 may search the video store 120 by identifying videos that are annotated with the search term. In one embodiment, the video search module 220 identifies videos that are associated with an annotation term equal to, substantially equal to, or related to the search term. For instance, for a user providing the search term "soccer," the video search module 220 searches the videos store 120 for videos that are associated with the annotation term "soccer." Additionally, the video search module 220 may search the video store 120 for images that are associated with the annotation term "football," or the annotation term "futbol."

The model generation module 230 generates models for identifying images or video frames based on a set of images (image set) and/or videos (video set). In one embodiment, the model generation module 230 uses the set of images/videos to generate a model that can be used to identify other images/videos that are similar to the image/videos in the set. For instance, assume the image set contains images that are annotated with the term "slam dunk." The model generation module 230 examines the images in the image set and generates an image identification model that can be applied to other images (such as unannotated images) to identify ones of the other images that are show slam dunks or are otherwise associated with the term "slam dunk."

Since videos are essentially sequences of images, an image identification model generated from an image set associated with a particular annotation term can be applied to a video in order to identify frames of the video that are also associated with the annotation term. Likewise, a video model generated from video set of videos associated with an annotation term can be applied to an image to determine whether the image is also associated with the annotation term.

In one embodiment, the model is represented as a machine-learned classifier. The annotated images or videos associated with the annotation term are used as a training set in the machine learning process, and the process analyzes the features of the training set in order to produce a classifier (e.g., a statistical model). The classifier can then be applied to the features of a new image/video of unknown classification in order to generate a score, such as a binary or continuous value, indicating a likelihood that the new image/video is associated with the annotation term. Different types of classifiers may be used in different embodiments. For example, a convolutional neural network (CNN) or a deep neural network (DNN) classifier may be used. Likewise, positive and negative training sets may be used in some embodiments.

In some embodiments, the model generation module 230 generates a temporal model to identify video segments based on a set of images. The temporal model determines whether a set of temporally contiguous video frames are related to an annotation term based on images of the image set. The model generated by the model generation module 230 may determine a score representative of how related a video segment is to the annotation term.

The model refining module 235 filters image sets and video sets using models generated by the model generation module 230. In one embodiment, the search filtering module 235 uses an image identification model generated based on a set of images to filter a set of videos, and uses a video identification model generated based on a set of videos to filter a set of images. For instance, assume again that the set of images contains images annotated with the term "slam dunk" and that the set of videos contains videos annotated with the same term. Also assume the model generation module 230 generates a video identification model from the video set. This model can detect frames of videos (which are essentially images) that are associated with the term "slam dunk."

In one embodiment, the model refining module 235 applies the video identification model to the image set. The video identification model thus generates a score for each image indicating how strongly the features of the image fit the model. The model refining module 235 refines the image set by removing images that have scores below a threshold from the set. In this way, the image set is filtered to exclude images unlikely to be associated with the annotation term (e.g., "slam dunk"). The excluded images might be images that are incorrectly annotated, for example. The images remaining in the image set are referred to as "iconic images."

The model refining module 235 may also apply the image identification model to the video set in order to determine how strongly the individual frames of the videos fit the model. This model is also called a "frame level model." The model refining module 235 may thus refine the video set by removing videos and/or frames of videos that have scores below a threshold from the set. In addition, the model refining module 235 may identify frames of videos that are strongly associated with the annotation term by identifying frames having scores above a threshold.

In one embodiment, the model refining module 235 operates iteratively to improve the models and refine the image and video sets. The model refining module 235 first identify a set of videos associated with an annotation term (e.g., "slam dunk") and a set of images associated with the same term. Then the model refining module 235 generates a video identification model based on the videos in the set. The model refining module 235 applies the video identification model to the image set in order to filter out images that do not satisfy the model (i.e., have scores below a threshold) in order to produce a refined image set. The filtered out images, for example, may be improperly annotated or otherwise not related to the majority of images that are associated with the annotation term. The model refining module 235 next generates an image identification model using the refined image set. The model refining module 235 subsequently applies the image identification model to the frames of the video in the video set in order to filter out frames that do not satisfy the image model and, conversely, to identify frames that do satisfy the image model. The frames that satisfy the image identification model can then form a refined video set, which can be used to generate a refined video model, and so on.

The model refining module 235 can perform the refining process described above a single time, creating only a single image identification model based on a set of iconic images that is then used as a frame level model to identify frames that satisfy the image identification model, or can be iterated numerous times until a stopping condition is reached. For example, the refining process can be iterated a specified number of times, or may be iterated until the models converge and fewer than a threshold number of images/frames are removed with each filtering pass.

The video annotation module 240 identifies videos using one or more models generated by the model generation module 230 and annotates the videos with annotation terms describing the contents of the videos. To annotate a video, the video annotation module 240 stores metadata together with the video. The metadata stored with the video includes at least the annotation term and may include additional information, such as temporal information of where a video segment related to the annotation term is located within the video. For instance, if an image identification model is generated by the model generation module 230 using the term "slam dunk," the video annotation module 240 identifies videos with slam dunks using the generated model and annotates the videos that are identified as containing slam dunks with the annotation term "slam dunk." The video annotation module 240 further associates a timestamp and/or other metadata with the video that indicates which temporal segments of the video show the slam dunk.

To perform the annotation, the video annotation module 240 applies an image identification model generated by the model generation module 230 to frames of a video and identifies the video frames that are related to the annotation term. In one embodiment, the model calculates a score for the video frame and the video frame is identified as related to the annotation term if the score is larger than a threshold value. The video annotation module 240 then identifies a video segment within a video that is related to the annotation term by identifying multiple consecutive (or otherwise temporally close) video frames with scores larger than the threshold value and annotating the identified video segment with the annotation term.

In some embodiments, the identified video segment includes a specified number of video frames immediately prior to, and/or immediately after the multiple consecutive video frames having scores larger than the threshold value. The number of frames may be specified by the actual number of frames or based on time. For instance, the identified video segment may include video frames located 5 seconds prior to and 5 seconds after the multiple consecutive video frames with scores larger than the threshold value.

The web server 250 links the video search server 130 via the network 105 to the client devices 110. The web server 250 serves web pages, as well as other content, such as JAVA®, FLASH®, XML and so forth. The web server 250 may receive a search term from the one or more client devices 110 and provides search results back to the one or more client devices 110. For example, the web server 250 may receive the search term "slam dunk" and provide back as search results videos annotated with the same term. In addition, the web server 250 may provide the metadata indicating the temporal locations of the segments within the videos that are associated with the term. As such, the user performing a search can use the metadata to directly access the video segment related to the term.

Video Segment Identification

Figure 3:
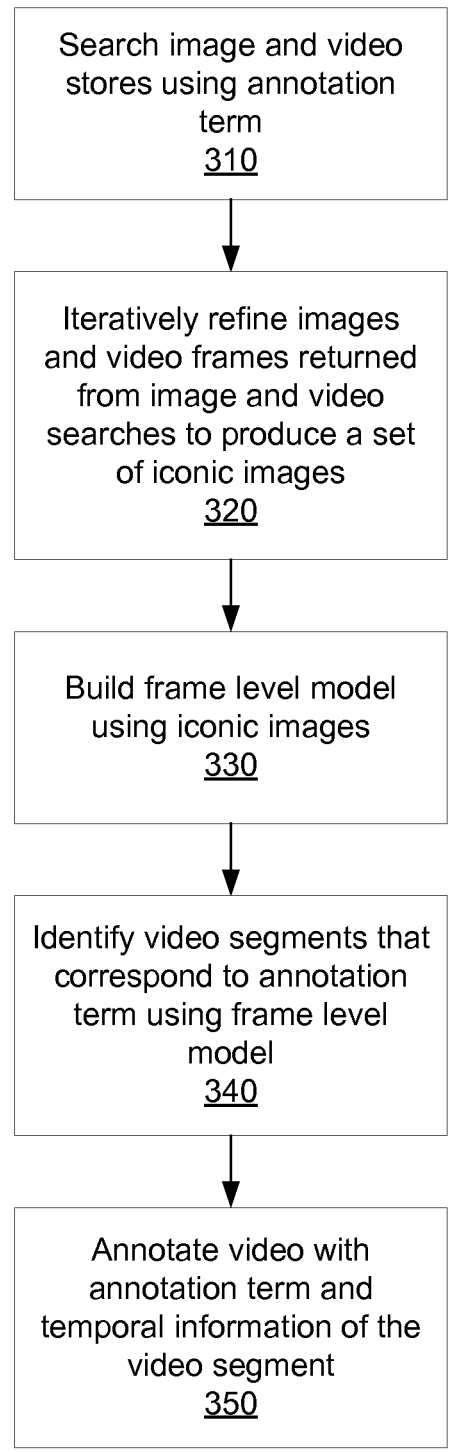
FIG. 3 illustrates a flow diagram of a process for identifying video segments corresponding to an annotation term, according to one embodiment.

FIG. 3 illustrates a flow diagram of an example process for identifying video segments corresponding to an annotation term, according to one embodiment. The steps of FIG. 3 are performed by the different modules of the video search server 130, according to one embodiment. In other embodiments, the steps may be performed by different modules than those indicated herein, and/or the steps may be performed in different orders.

The image search module 210 searches 310 the image store 125 and the video search module 220 searches 310 the video store 120 using an annotation term. The annotation term may be a search term provided by a user using a client device 110. Alternatively, the annotation term may be selected by a system administrator of the video search server 130 for the specific purpose of identifying and annotating segments of videos associated with the search term. For example, the annotation term may be selected by the administrator from a set of popular or common search terms used by users of the video search server 130 in order to improve the user experience by annotating the videos in advance. The image search performed by the image search module 210 generates an image set and the video search performed by the video search module 220 generates a video set.

The model refining module 235 iteratively refines 320 the image set and the video set using models generated by the model generation module 230 to produce a set of iconic images. Under direction of the model refining module 235, the model generation module 230 generates 330 a frame level model to identify video frames of videos using the set of iconic images. The video annotation module 240 identifies 340 video segments in videos of the video set that are related to the annotation term using the frame level model generated by the model generation module 235. The video annotation module 240 then annotates 350 the videos with the annotation term and the temporal locations of the video segments related to the annotation term.

In some embodiments, the video search server 130 receives a search query from a user using a client device 110. The search query may include an annotation term used to annotate videos of the video store 120. The video search server 130 then provides the user with the videos related to the search query and the annotations associated with the video. The annotations indicate temporal locations of segments within the videos that are associated with the annotation term, so that the user can quickly seek to the relevant segments of the videos.

Figure 4:
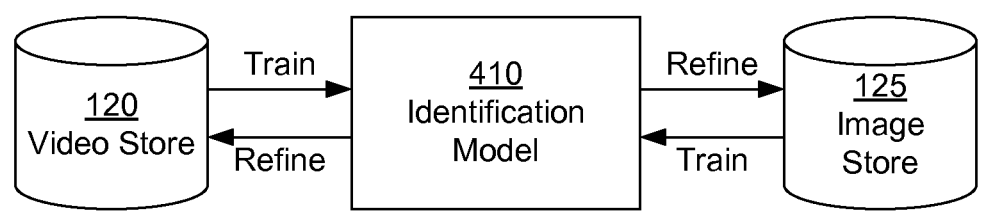
FIG. 4 illustrates a flow diagram of the iterative process for refining the image dataset and the video dataset, according to one embodiment.

FIG. 4 illustrates flow diagram the iterative process for iteratively refining 320 the image set and the video set, according to one embodiment. The model generation module 230 generates an identification model 410 (e.g., a video identification model) by training a classifier using videos from the video store 120. The videos used by the model generation module 230 to train the classifier to generate the identification model 410 are selected by the video search module 220 based on an annotation term.

The model refining module 235 refines an image set from the image store using the identification model 410. For instance, the model refining module 235 filters an image set selected by the image search module 210 using the identification model 410 created based on the videos. The model generation module 230 then generates an identification model 410 (e.g., an image identification model) by training a classifier using the filtered image set. In some embodiments, the model generation module 230 trains a new classifier using the filtered image set. In other embodiments, the model generation module 230 refines the classifier trained using the video from the video store, using the filtered image set.

The model refining module 235 filters the videos of the video store using the identification model 410 generated using the filtered image set. This process may be repeated one or more times, or until the process does not result in further refinement of the image set and/or the video set. For instance, a new identification model 410 is generated using the filtered video set. The iterative process results in a refined image set and/or refined video set that includes a set of iconic images.

Computer System

Figure 5:
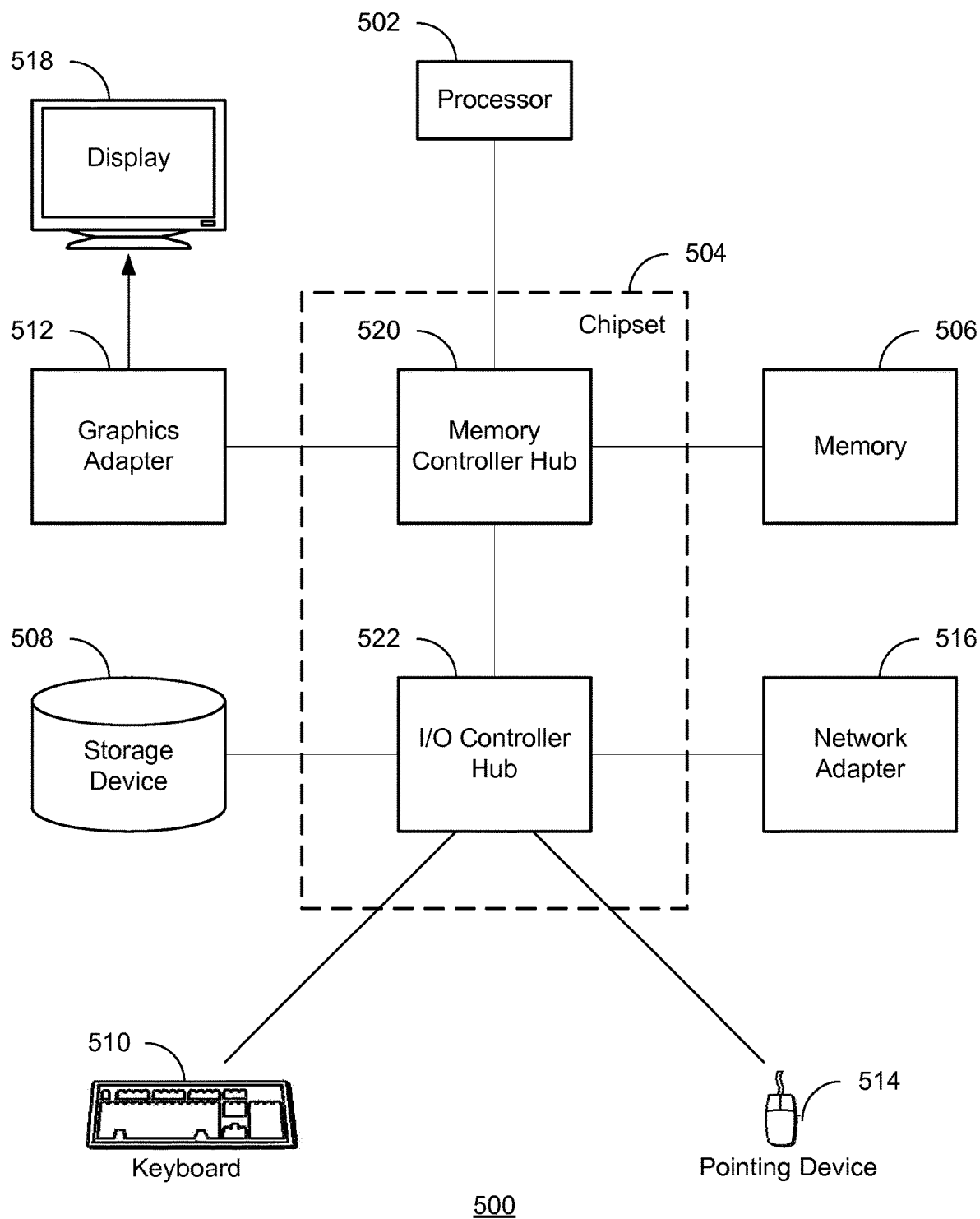
FIG. 5 is a high-level block diagram illustrating an example computer usable to implement entities of the environment for annotating video segments, according to one embodiment.

The client device 110 and the video search server 130 may be implemented using one or more computers. FIG. 5 is a high-level block diagram illustrating an example computer 500 usable to implement entities of the video annotation environment, in accordance with one embodiment.

The computer 500 includes at least one processor 502 (e.g., a central processing unit, a graphics processing unit) coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, keyboard 510, pointing device 514, and network adapter 516 are coupled to the I/O controller hub 522. Other embodiments of the computer 500 have different architectures.

The storage device 508 is a non-transitory computer-readable storage medium such as a hard drive, compact disk read-only memory (CD-ROM), DVD, or a solid-state memory device. The memory 506 holds instructions and data used by the processor 502. The processor 502 may include one or more processors 502 having one or more cores that execute instructions. The pointing device 514 is a mouse, track ball, or other type of pointing device, and is used in combination with the keyboard 510 to input data into the computer 500. The graphics adapter 512 displays digital content and other images and information on the display 518. The network adapter 516 couples the computer 500 to one or more computer networks (e.g., network 105).

The computer 500 is adapted to execute computer program modules for providing functionality described herein including identifying video segments within a video, related to an annotation term and annotating the video with the annotation term and temporal information of the video segment within the video. As used herein, the term "module" refers to computer program logic used to provide the specified functionality. Thus, a module can be implemented in hardware, firmware, and/or software. In one embodiment of a computer 500 that implements the video search server 130, program modules such as the image search module 210 the video search module 220, the model generation module 230, and the video annotation module 240 are stored on the storage device 508, loaded into the memory 506, and executed by the processor 502.

The types of computers 500 used by the entities of the video annotation environment can vary depending upon the embodiment and the processing power required by the entity. For example, the video search server 130 might comprise multiple blade servers working together to provide the functionality described herein. The computers 500 may contain duplicates of some components or may lack some of the components described above (e.g., a keyboard 510, a graphics adapter 512, a pointing device 514, a display 518). For example, the video search server 130 may run in a single computer 500 or multiple computers 500 communicating with each other through a network such as in a server farm.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the embodiments. This description should be read to include one or at least one and the singular also includes the plural unless it is obvious that it is meant otherwise.

Additional alternative structural and functional designs may be implemented for a system and a process for a video annotation environment. Thus, while particular embodiments and applications have been illustrated and described, it is to be understood that the disclosed embodiments are not limited to the precise construction and components disclosed herein. Various modifications, changes and variations may be made in the arrangement, operation and details of the method and apparatus disclosed herein without departing from the spirit and scope defined in the appended claims.

The invention claimed is:

1. A method for identifying video segments related to annotation terms, the method comprising:
    receiving, using a hardware processor, a search query that includes an annotation term;
    in response to receiving the search query, searching, using the hardware processor, a video storage device that stores videos uploaded by one or more client devices based on the annotation term to generate a video set of videos that have each been annotated with the annotation term and searching an image storage device that stores images uploaded by one or more client devices based on the annotation term to generate an image set of images that have each been annotated with the annotation term;
    generating, using the hardware processor, an image identification model that identifies images that have each been annotated with the annotation term and generating a video identification model that identifies image frames in videos that have each been annotated with the annotation term;
    iteratively refining, using the hardware processor, the video set by applying the image identification model that is based on the image set to filter videos that do not satisfy the image identification model and the image set by applying the video identification model that is based on the video set to filter images that do not satisfy the video identification model;
    generating, using the hardware processor, a set of iconic images that includes images remaining in frames of videos remaining in the refined video set and includes images remaining in the refined image set;
    generating, using the hardware processor, a frame level model using the set of iconic images;
    identifying, using the hardware processor, video segments of a target video, the video segments related to the annotation term, by applying the generated frame level model to frames of the target video; and
    providing, using the hardware processor, the target video responsive to the received search query and annotations associated with the target video, wherein each of the annotations includes a timestamp that indicates a temporal location of one of the identified video segments that is associated with the annotation term.

2. The method of claim 1, wherein iteratively refining the video set and the image set comprises:
    generating the image identification model to identify images related to the annotation term, the image identification model generated using images of the image set; and
    refining the video set by applying the image identification model to video frames of videos of the video set to generate a refined video set.

3. The method of claim 1, wherein applying the frame level model to frames of the target video comprises:
    determining, for a plurality of frames of the target video, scores indicating a relevancy of the frames to the annotation term, using the frame level model; and
    associating a segment of the target video with the annotation term responsive to video frames included in the segment of the video having a score larger than a threshold value.

4. The method of claim 3, wherein associating the segment of the target video with the annotation term comprises:
    identifying a plurality of temporally contiguous video frames of the target video having scores larger than the threshold value; and
    associating a segment of the target video that includes the plurality of temporally contiguous video frames having scores larger than the threshold value with the annotation term.

5. The method of claim 4, wherein the segment of the target video includes a specified number of frames immediately prior to the plurality of temporally contiguous video frames having scores larger than the threshold value.

6. The method of claim 4, wherein the segment of the target video includes a specified number of frames immediately after the plurality of temporally contiguous video frames having scores larger than the threshold value.

7. A non-transitory computer-readable storage medium storing executable computer program instruction for identifying video segments related to annotation terms, the computer program instructions comprising instructions for:
    receiving a search query that includes an annotation term;
    in response to receiving the search query, searching a video storage device that stores videos uploaded by one or more client devices based on the annotation term to generate a video set of videos that have each been annotated with the annotation term and searching an image storage device that stores images uploaded by one or more client devices based on the annotation term to generate an image set of images that have each been annotated with the annotation term;
    generating an image identification model that identifies images that have each been annotated with the annotation term and generating a video identification model that identifies image frames in videos that have each been annotated with the annotation term;
    iteratively refining the video set by applying the image identification model that is based on the image set to filter videos that do not satisfy the image identification model and the image set by applying the video identification model that is based on the video set to filter images that do not satisfy the video identification model;

generating a set of iconic images that includes images remaining in frames of videos remaining in the refined video set and includes images remaining in the refined image set;

generating a frame level model using the set of iconic images;

identifying video segments of a target video, the video segments related to the annotation term, by applying the generated frame level model to frames of the target video; and providing the target video responsive to the received search query and annotations associated with the target video, wherein each of the annotations includes a timestamp that indicates a temporal location of one of the identified video segments that is associated with the annotation term.

8. The computer-readable storage medium of claim 7, wherein iteratively refining the video set and the image set comprises:

generating the image identification model to identify images related to the annotation term, the image identification model generated using images of the image set; and refining the video set by applying the image identification model to video frames of videos of the video set to generate a refined video set.

9. The computer-readable storage medium of claim 7, wherein applying the frame level model to frames of the target video comprises:

determining, for a plurality of frames of the target video, scores indicating a relevancy of the frames to the annotation term, using the frame level model; and associating a segment of the target video with the annotation term responsive to video frames included in the segment of the video having a score larger than a threshold value.

10. The computer-readable storage medium of claim 9, wherein associating the segment of the target video with the annotation term comprises:

identifying a plurality of temporally contiguous video frames of the target video having scores larger than the threshold value; and associating a segment of the target video that includes the plurality of temporally contiguous video frames having scores larger than the threshold value with the annotation term.

11. The computer-readable storage medium of claim 10, wherein the segment of the target video includes a specified number of frames immediately prior to the plurality of temporally contiguous video frames having scores larger than the threshold value.

12. The computer-readable storage medium of claim 10, wherein the segment of the target video includes a specified number of frames immediately after the plurality of temporally contiguous video frames having scores larger than the threshold value.

13. A computer system for identifying video segments related to an annotation term, the computer system comprising:

a memory; and a hardware processor that, when executing computer executable instructions stored in the memory, is configured to:

receive a search query that includes an annotation term;

in response to receiving the search query, search a video storage device that stores videos uploaded by one or more client devices based on the annotation term to generate a video set of videos that have each been annotated with the annotation term and searching an image storage device that stores images uploaded by one or more client devices based on the annotation term to generate an image set of images that have each been annotated with the annotation term;

generate an image identification model that identifies images that have each been annotated with the annotation term and generating a video identification model that identifies image frames in videos that have each been annotated with the annotation term;

iteratively refine the video set by applying the image identification model that is based on the image set to filter videos that do not satisfy the image identification model and the image set by applying the video identification model that is based on the video set to filter images that do not satisfy the video identification model;

generate a set of iconic images that includes images remaining in frames of videos remaining in the refined video set and includes images remaining in the refined image set;

generate a frame level model using the set of iconic images;

identify video segments of a target video, the video segments related to the annotation term, by applying the generated frame level model to frames of the target video; and provide the target video responsive to the received search query and annotations associated with the target video, wherein each of the annotations includes a timestamp that indicates a temporal location of one of the identified video segments that is associated with the annotation term.

14. The computer system of claim 13, wherein iteratively refining the video set and the image set comprises:

generating the image identification model to identify images related to the annotation term, the image identification model generated using images of the image set; and refining the video set by applying the image identification model to video frames of videos of the video set to generate a refined video set.

15. The computer system of claim 13, wherein applying the frame level model to frames of the target video comprises:

determining, for a plurality of frames of the target video, scores indicating a relevancy of the frames to the annotation term, using the frame level model; and associating a segment of the target video with the annotation term responsive to video frames included in the segment of the video having a score larger than a threshold value.

16. The computer system of claim 15, wherein associating the segment of the target video with the annotation term comprises:

identifying a plurality of temporally contiguous video frames of the target video having scores larger than the threshold value; and associating a segment of the target video that includes the plurality of temporally contiguous video frames having scores larger than the threshold value with the annotation term.

17. The computer system of claim 16, wherein the segment of the target video includes a specified number of frames immediately prior to the plurality of temporally contiguous video frames having scores larger than the threshold value.

\* \* \* \* \*